US012741676B2

(12) United States Patent
Lashkari

(10) Patent No.: US 12,741,676 B2
(45) Date of Patent: Sep. 22, 2026

(54) PATH PLANNING SYSTEM AND METHOD FOR A VEHICLE

(71) Applicant: GM Global Technology Operations LLC, Detroit, MI (US)

(72) Inventor: Negin Lashkari, Markham (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 168 days.

(21) Appl. No.: 18/671,132

(22) Filed: May 22, 2024

(65) Prior Publication Data

US 2025/0360945 A1 Nov. 27, 2025

(51) Int. Cl.
*B60W 60/00* (2020.01)
*G01C 21/34* (2006.01)

(52) U.S. Cl.
CPC .. *B60W 60/00184* (2020.02); *B60W 60/0011* (2020.02); *B60W 60/00274* (2020.02); *G01C 21/3446* (2013.01)

(58) Field of Classification Search
CPC ....... B60W 60/00274; B60W 60/0011; B60W 60/00184
See application file for complete search history.

(56) References Cited

U.S. PATENT DOCUMENTS 11,179,850 B2 * 11/2021 Dupuis ................ G05D 1/0291
2021/0146961 A1 * 5/2021 Gall .................. B60W 60/0053
2023/0303120 A1 * 9/2023 Xiu ...................... B62D 15/021
2025/0033661 A1 * 1/2025 Wang ................. B62D 15/0285

FOREIGN PATENT DOCUMENTS

CN 112344943 A 2/2021
WO WO-2016045615 A1 * 3/2016 ............... G05D 1/02

OTHER PUBLICATIONS

Ahmed Abdelbasit, Nesreen I. Ziedan, Tamer S.Gaafar, Artificial Potential Field Approaches for Indoor Mobile Robot Path Planning: A Review, 2023, The Egyptian International Journal of Engineering Sciences and Technology, vol. 44, pp. 89-98 (Year: 2023).*
Abdelbasit, A., et al. "Artificial Potential Field Approaches for Indoor Mobile Robot Path Planning: A Review," The Egyptian International Journal of Engineering Sciences and Technology, vol. 44, 2023, pp. 89-98.

* cited by examiner

*Primary Examiner* — Khoi H Tran
*Assistant Examiner* — Tristan J Greiner
(74) *Attorney, Agent, or Firm* — Vivacqua Crane, PLLC

(57) ABSTRACT

A method for path planning for a vehicle may include determining a repulsive potential at each of a plurality of location points in an environment surrounding the vehicle using a vehicle perception sensor. The method further may include determining an attractive potential at each of the plurality of location points in the environment surrounding the vehicle using the vehicle perception sensor. The method further may include calculating a potential field representing the environment surrounding the vehicle based at least in part on the attractive potential at each of the plurality of location points and the repulsive potential at each of the plurality of location points. The potential field quantifies a suitability of each of the plurality of location points in the environment for inclusion in a path for the vehicle. The method further may include generating the path for the vehicle based at least in part on the potential field.

20 Claims, 3 Drawing Sheets

PATH PLANNING SYSTEM AND METHOD FOR A VEHICLE

INTRODUCTION

The present disclosure relates to navigation, routing, and path planning systems and methods for vehicles.

To increase occupant awareness and convenience, vehicles may be equipped with advanced driver assistance systems (ADAS) and/or automated driving systems (ADS). ADAS systems may use various sensors such as cameras, radar, and LiDAR to detect and identify objects around the vehicle, including other vehicles, pedestrians, road configurations, traffic signs, and road markings. ADAS systems may take actions based on environmental conditions surrounding the vehicle, such as applying brakes or alerting an occupant of the vehicle. ADS systems may use various sensors to detect objects in the environment around the vehicle and control the vehicle to navigate the vehicle through the environment to a predetermined destination. ADAS and ADS systems may also use vehicle location obtained using global navigation satellite systems (GNSS) in conjunction with globally aligned maps for navigation routing, path pathing, lane identification, obstacle avoidance, and/or the like. However, globally aligned maps may lack information about dynamic road conditions such as road construction or traffic congestion.

Thus, while current navigation, routing, and path planning systems and methods achieve their intended purpose, there is a need for a new and improved system and method for path planning for a vehicle.

SUMMARY

According to several aspects, A method for path planning for a vehicle is provided. The method may include determining a repulsive potential at each of a plurality of location points in an environment surrounding the vehicle using a vehicle perception sensor. The method further may include determining an attractive potential at each of the plurality of location points in the environment surrounding the vehicle using the vehicle perception sensor. The method further may include calculating a potential field representing the environment surrounding the vehicle based at least in part on the attractive potential at each of the plurality of location points and the repulsive potential at each of the plurality of location points. The potential field quantifies a suitability of each of the plurality of location points in the environment for inclusion in a path for the vehicle. The method further may include generating the path for the vehicle based at least in part on the potential field.

In another aspect of the present disclosure, determining the repulsive potential at each of the plurality of location points further may include detecting a plurality of obstacles using the vehicle perception sensor. Determining the repulsive potential at each of the plurality of location points further may include measuring a distance between each of the plurality of location points and each of the plurality of obstacles using the vehicle perception sensor. Determining the repulsive potential at each of the plurality of location points further may include calculating the repulsive potential at each of the plurality of location points based at least in part on the distance between each of the plurality of location points and each of the plurality of obstacles.

In another aspect of the present disclosure, detecting the plurality of obstacles further may include detecting the plurality of obstacles using the vehicle perception sensor. At least one of the plurality of obstacles is a marker, barrier, or road sign indicating a construction zone.

In another aspect of the present disclosure, calculating the repulsive potential at each of the plurality of location points further may include calculating the repulsive potential at each of the plurality of location points, where the repulsive potential at each of the plurality of location points is defined by a repulsive potential function:

$$U_{rep}(s) = \sum \begin{cases} \frac{1}{2} k_r \left( \frac{1}{\rho_i} - \frac{1}{\rho_{0,i}} \right)^2 & \text{if } \rho_i \leq \rho_{0,i} \\ 0 & \text{if } \rho_i > \rho_{0,i} \end{cases}$$

where $U_{rep}(s)$ Is the repulsive potential function, s is a vector describing a location of one of the plurality of location points, $k_r$ Is a predetermined repulsive constant, $\rho_i$ Is a distance between the location of the one of the plurality of location points and an ith obstacle of the plurality of obstacles, $\rho_{0,i}$ Is a minimum allowed distance between the vehicle and the ith obstacle of the plurality of obstacles, and a summation operator $\sigma$ indicates a summation over each of the plurality of obstacles.

In another aspect of the present disclosure, determining the attractive potential at each of the plurality of location points further may include determining a goal location in the environment. Determining the attractive potential at each of the plurality of location points further may include determining a distance between each of the plurality of location points and the goal location. Determining the attractive potential at each of the plurality of location points further may include calculating the attractive potential at each of the plurality of location points based at least in part on the distance between each of the plurality of location points and the goal location.

In another aspect of the present disclosure, calculating the attractive potential at each of the plurality of location points, where the attractive potential at each of the plurality of location points is defined by an attractive potential function:

$$U_{att}(s) = \begin{cases} k_a |s - s_d|^2 & \text{if } |s - s_d| \leq d_a \\ k_a \left( 2d_a |s - s_d| - d_a^2 \right) & \text{if } |s - s_d| > d_a \end{cases}$$

where $U_{att}(s)$ Is the attractive potential function, s is a vector describing a location of one of the plurality of location points, $k_a$ Is a predetermined attractive constant, $s_d$ Is a vector describing the goal location, and $d_a$ Is a predetermined attractive threshold.

In another aspect of the present disclosure, calculating the potential field further may include determining a repulsive force at each of the plurality of location points based at least in part on the repulsive potential at each of the plurality of location points. Calculating the potential field further may include determining an attractive force at each of the plurality of location points based at least in part on the attractive potential at each of the plurality of location points. Calculating the potential field further may include calculating the potential field based at least in part on the repulsive force at each of the plurality of location points and the attractive force at each of the plurality of location points.

In another aspect of the present disclosure, calculating the potential field further may include calculating the potential field based at least in part on the repulsive force at each of the plurality of location points and the attractive force at each of the plurality of location points. A value of the potential field at each of the plurality of location points is equal to a sum of the repulsive force at each of the plurality of location points and the attractive force at each of the plurality of location points. The potential field at each of the plurality of location points is defined by a potential field function:

$$F(s) = \left\{ \sum \begin{cases} k_r\left(\frac{1}{\rho_i} - \frac{1}{\rho_{0,i}}\right)\frac{1}{\rho_i^2}\frac{s-s_0}{\rho_i} & \text{if } \rho_i \le \rho_{0,i} \\ 0 & \text{if } \rho_i > \rho_{0,i} \end{cases} \right\} + \begin{cases} -2k_a(s-s_d) & \text{if } |s-s_d| \le d_a \\ -2k_a d_a \frac{s-s_d}{|s-s_d|} & \text{if } |s-s_d| > d_a \end{cases}$$

where F(s) Is the potential field function, s is a vector describing a location of one of the plurality of location points, $k_r$ Is a predetermined repulsive constant, $\rho_i$ Is a distance between the location of the one of the plurality of location points and an ith obstacle of a plurality of obstacles, $\rho_{0,i}$ Is a minimum allowed distance between the vehicle and the ith obstacle of the plurality of obstacles, $s_0$ is a vector describing a location of one of the plurality of obstacles which is closest to the one of the plurality of location points s, a summation operator Σ indicates a summation over each of the plurality of obstacles, $k_a$ Is a predetermined attractive constant, $s_d$ Is a vector describing a goal location, and $d_a$ Is a predetermined attractive threshold.

In another aspect of the present disclosure, generating the path for the vehicle further may include generating a plurality of candidate points. Each of the plurality of candidate points describes a possible location of the vehicle after driving for a predetermined length of time. Generating the path for the vehicle further may include determining a plurality of feasible candidate points. The plurality of feasible candidate points includes a subset of the plurality of candidate points. A value of the potential field at each of the plurality of feasible candidate points is less than or equal to a predetermined potential field value threshold. Generating the path for the vehicle further may include determining a plurality of optimal feasible candidate points. The plurality of optimal feasible candidate points includes a subset of the plurality of feasible candidate points. The plurality of optimal feasible candidate points is determined using an optimization algorithm. The plurality of optimal feasible candidate points is determined based at least in part on a value of the potential field at each of the plurality of feasible candidate points. Generating the path for the vehicle further may include generating the path for the vehicle based at least in part on the plurality of optimal feasible candidate points. The path for the vehicle includes at least the plurality of optimal feasible candidate points.

In another aspect of the present disclosure, determining the plurality of optimal feasible candidate points further may include determining the plurality of optimal feasible candidate points such as to minimize a cost function. The cost function is determined based at least in part on the potential field function.

According to several aspects, a system for path planning for a vehicle is provided. The system may include a vehicle perception sensor and a controller in electrical communication with the vehicle perception sensor. The controller is programmed to determine a repulsive potential at each of a plurality of location points in an environment surrounding the vehicle using a vehicle perception sensor. The controller is further programmed to determine an attractive potential at each of the plurality of location points in the environment surrounding the vehicle using the vehicle perception sensor. The controller is further programmed to calculate a potential field representing the environment surrounding the vehicle based at least in part on the attractive potential at each of the plurality of location points and the repulsive potential at each of the plurality of location points. The potential field quantifies a suitability of each of the plurality of location points in the environment for inclusion in a path for the vehicle. The controller is further programmed to generate the path for the vehicle based at least in part on the potential field.

In another aspect of the present disclosure, to determine the repulsive potential, the controller is further programmed to detect a plurality of obstacles using the vehicle perception sensor. At least one of the plurality of obstacles is a marker, barrier, or road sign indicating a construction zone. To determine the repulsive potential, the controller is further programmed to measure a distance between each of the plurality of location points and each of the plurality of obstacles using the vehicle perception sensor. To determine the repulsive potential, the controller is further programmed to calculate the repulsive potential at each of the plurality of location points. The repulsive potential at each of the plurality of location points is defined by a repulsive potential function:

$$U_{rep}(s) = \sum \begin{cases} \frac{1}{2}k_r\left(\frac{1}{\rho_i} - \frac{1}{\rho_{0,i}}\right)^2 & \text{if } \rho_i \le \rho_{0,i} \\ 0 & \text{if } \rho_i > \rho_{0,i} \end{cases}$$

where $U_{rep}(s)$ Is the repulsive potential function, s is a vector describing a location of one of the plurality of location points, $k_r$ Is a predetermined repulsive constant, $\rho_i$ Is a distance between the location of the one of the plurality of location points and an ith obstacle of the plurality of obstacles, $\rho_{0,i}$ Is a minimum allowed distance between the vehicle and the ith obstacle of the plurality of obstacles, and a summation operator Σ indicates a summation over each of the plurality of obstacles.

In another aspect of the present disclosure, to determine the attractive potential, the controller is further programmed to determine a goal location in the environment. To determine the attractive potential, the controller is further programmed to determine a distance between each of the plurality of location points and the goal location. To determine the attractive potential, the controller is further programmed to calculate the attractive potential at each of the plurality of location points. The attractive potential at each of the plurality of location points is defined by an attractive potential function:

$$U_{att}(s) = \begin{cases} k_a|s-s_d|^2 & \text{if } |s-s_d| \le d_a \\ k_a(2d_a|s-s_d| - d_a^2) & \text{if } |s-s_d| > d_a \end{cases}$$

where $U_{att}(s)$ Is the attractive potential function, s is the vector describing a location of one of the plurality of location points, $k_a$ Is a predetermined attractive constant, $s_d$ Is a vector describing the goal location, and $d_a$ Is a predetermined attractive threshold.

In another aspect of the present disclosure, to calculate the potential field, the controller is further programmed to determine a repulsive force at each of the plurality of location points based at least in part on the repulsive potential at each of the plurality of location points. To calculate the potential field, the controller is further programmed to determine an attractive force at each of the plurality of location points based at least in part on the attractive potential at each of the plurality of location points. To calculate the potential field, the controller is further programmed to calculate the potential field based at least in part on the repulsive force at each of the plurality of location points and the attractive force at each of the plurality of location point. A value of the potential field at each of the plurality of location points is equal to a sum of the repulsive force at each of the plurality of location points and the attractive force at each of the plurality of location points. The potential field at each of the plurality of location points is defined by a potential field function:

$$F(s)=F_r(s)+F_a(s)$$

where F(s) Is the potential field function, $F_r(s)$ Is a repulsive force function, and $F_a(s)$ Is an attractive force function.

In another aspect of the present disclosure, to determine the repulsive force, the controller is further programmed to determine the repulsive force at each of the plurality of location points. The repulsive force at each of the plurality of location points is defined by the repulsive force function:

$$F_r(s)=-\nabla U_{rep}(s)=\sum\begin{cases}k_r\left(\frac{1}{\rho_i}-\frac{1}{\rho_{0,i}}\right)\frac{1}{\rho_i^2}\frac{s-s_0}{\rho_i} & \text{if } \rho_i\leq\rho_{0,i}\\ 0 & \text{if } \rho_i>\rho_{0,i}\end{cases}$$

where $F_r(s)$ Is the repulsive force function, $\nabla$ is a gradient operator, s is the vector describing a location of one of the plurality of location points, $k_r$ Is the predetermined repulsive constant, $\rho_i$ Is the distance between the location of the one of the plurality of location points and the ith obstacle of a plurality of obstacles, $\rho_{0,i}$ Is the minimum allowed distance between the vehicle and the ith obstacle of the plurality of obstacles, $s_0$ is the vector describing a location of one of the plurality of obstacles which is closest to the one of the plurality of location points s, and the summation operator Σ indicates a summation over each of the plurality of obstacles.

In another aspect of the present disclosure, to determine the attractive force, the controller is further programmed to determine the attractive force at each of the plurality of location points. The attractive force at each of the plurality of location points is defined by the attractive force function:

$$F_a(s)=-\nabla U_{att}(s)=\begin{cases}-2k_a(s-s_d) & \text{if } |s-s_d|\leq d_a\\ -2k_a d_a\frac{s-s_d}{|s-s_d|} & \text{if } |s-s_d|>d_a\end{cases}$$

where $F_a(s)$ Is the attractive force function, $\nabla$ is the gradient operator, s is the vector describing a location of one of the plurality of location points, $k_a$ Is the predetermined attractive constant, $s_d$ Is the vector describing the goal location, and $d_a$ Is the predetermined attractive threshold.

In another aspect of the present disclosure, to generate the path for the vehicle, the controller is further programmed to generate a plurality of candidate points. Each of the plurality of candidate points describes a possible location of the vehicle after driving for a predetermined length of time. To generate the path for the vehicle, the controller is further programmed to determine a plurality of feasible candidate points. The plurality of feasible candidate points includes a subset of the plurality of candidate points. A value of the potential field at each of the plurality of feasible candidate points is less than or equal to a predetermined potential field value threshold. To generate the path for the vehicle, the controller is further programmed to determine a plurality of optimal feasible candidate points. The plurality of optimal feasible candidate points includes a subset of the plurality of feasible candidate points. The plurality of optimal feasible candidate points is determined using an optimization algorithm. The plurality of optimal feasible candidate points is determined based at least in part on a value of the potential field at each of the plurality of feasible candidate points. The plurality of optimal feasible candidate points is determined such as to minimize a cost function. The cost function is determined based at least in part on the potential field function. To generate the path for the vehicle, the controller is further programmed to generate the path for the vehicle based at least in part on the plurality of optimal feasible candidate points. The path for the vehicle includes at least the plurality of optimal feasible candidate points.

According to several aspects, a method for path planning for a vehicle is provided. The method may include detecting a plurality of obstacles using a vehicle perception sensor. The method further may include measuring a distance between each of a plurality of location points and each of a plurality of obstacles in an environment surrounding the vehicle using the vehicle perception sensor. The method further may include calculating a repulsive potential at each of the plurality of location points based at least in part on the distance between each of the plurality of location points and each of the plurality of obstacles. The method further may include determining a goal location in the environment. The method further may include determining a distance between each of the plurality of location points and the goal location. The method further may include calculating an attractive potential at each of the plurality of location points based at least in part on the distance between each of the plurality of location points and the goal location. The method further may include calculating a potential field representing the environment surrounding the vehicle based at least in part on the attractive potential at each of the plurality of location points and the repulsive potential at each of the plurality of location points. The potential field quantifies a suitability of each of the plurality of location points in the environment for inclusion in a path for the vehicle. The method further may include generating the path for the vehicle based at least in part on the potential field.

In another aspect of the present disclosure, calculating the potential field further may include determining a repulsive force at each of the plurality of location points. The repulsive force at each of the plurality of location points is defined by a repulsive force function:

$$F_r(s)=-\nabla U_{rep}(s)=\sum\begin{cases}k_r\left(\frac{1}{\rho_i}-\frac{1}{\rho_{0,i}}\right)\frac{1}{\rho_i^2}\frac{s-s_0}{\rho_i} & \text{if } \rho_i\leq\rho_{0,i}\\ 0 & \text{if } \rho_i>\rho_{0,i}\end{cases}$$

where $F_r(s)$ Is the repulsive force function, $\nabla$ is a gradient operator, s is a vector describing a location of one of the plurality of location points, $k_r$ Is a predetermined repulsive constant, $\rho_i$ Is a distance between the location of the one of the plurality of location points and an ith obstacle of a plurality of obstacles, $\rho_{0,i}$ Is a minimum allowed distance between the vehicle and the ith obstacle of the plurality of obstacles, $s_0$ is a vector describing a location of one of the plurality of obstacles which is closest to the one of the plurality of location points s, and a summation operator Σ indicates a summation over each of the plurality of obstacles. Calculating the potential field further may include determining an attractive force at each of the plurality of location points. The attractive force at each of the plurality of location points is defined by an attractive force function:

$$F_a(s) = -\nabla U_{att}(s) = \begin{cases} -2k_a(s - s_d) & \text{if } |s - s_d| \le d_a \\ -2k_a d_a \dfrac{s - s_d}{|s - s_d|} & \text{if } |s - s_d| > d_a \end{cases}$$

where $F_a(s)$ Is the attractive force function, ∇ is the gradient operator, s is the vector describing a location of one of the plurality of location points, $k_a$ Is a predetermined attractive constant, $s_d$ Is a vector describing a goal location, and $d_a$ Is a predetermined attractive threshold. Calculating the potential field further may include calculating the potential field based at least in part on the repulsive force at each of the plurality of location points and the attractive force at each of the plurality of location points. A value of the potential field at each of the plurality of location points is equal to a sum of the repulsive force at each of the plurality of location points and the attractive force at each of the plurality of location points. The potential field at each of the plurality of location points is defined by a potential field function:

$$F(s) = F_r(s) + F_a(s)$$

where F(s) Is the potential field function, $F_r(s)$ Is the repulsive force function, and $F_a(s)$ Is the attractive force function.

In another aspect of the present disclosure, generating the path for the vehicle further may include generating a plurality of candidate points. Each of the plurality of candidate points describes a possible location of the vehicle after driving for a predetermined length of time. Generating the path for the vehicle further may include determining a plurality of feasible candidate points. The plurality of feasible candidate points includes a subset of the plurality of candidate points, and where a value of the potential field function at each of the plurality of feasible candidate points is less than or equal to a predetermined potential field value threshold. Generating the path for the vehicle further may include determining a plurality of optimal feasible candidate points. The plurality of optimal feasible candidate points includes a subset of the plurality of feasible candidate points. The plurality of optimal feasible candidate points is determined using an optimization algorithm. The plurality of optimal feasible candidate points is determined based at least in part on a value of the potential field function at each of the plurality of feasible candidate points. The plurality of optimal feasible candidate points is determined such as to minimize a cost function. The cost function is determined based at least in part on the potential field function. Generating the path for the vehicle further may include generating the path for the vehicle based at least in part on the plurality of optimal feasible candidate points. The path for the vehicle includes at least the plurality of optimal feasible candidate points.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

In aspects of the present disclosure, driving a vehicle often requires one to recognize and adapt to dynamic or unexpected scenarios such as, for example, road construction, road congestion, blocked lanes, non-standard traffic patterns, and/or the like. Accordingly, the present disclosure provides a new and improved system and method for path planning for a semi- or fully-autonomous vehicle, providing for real-time path planning in dynamic roadway conditions.

Figure 1:
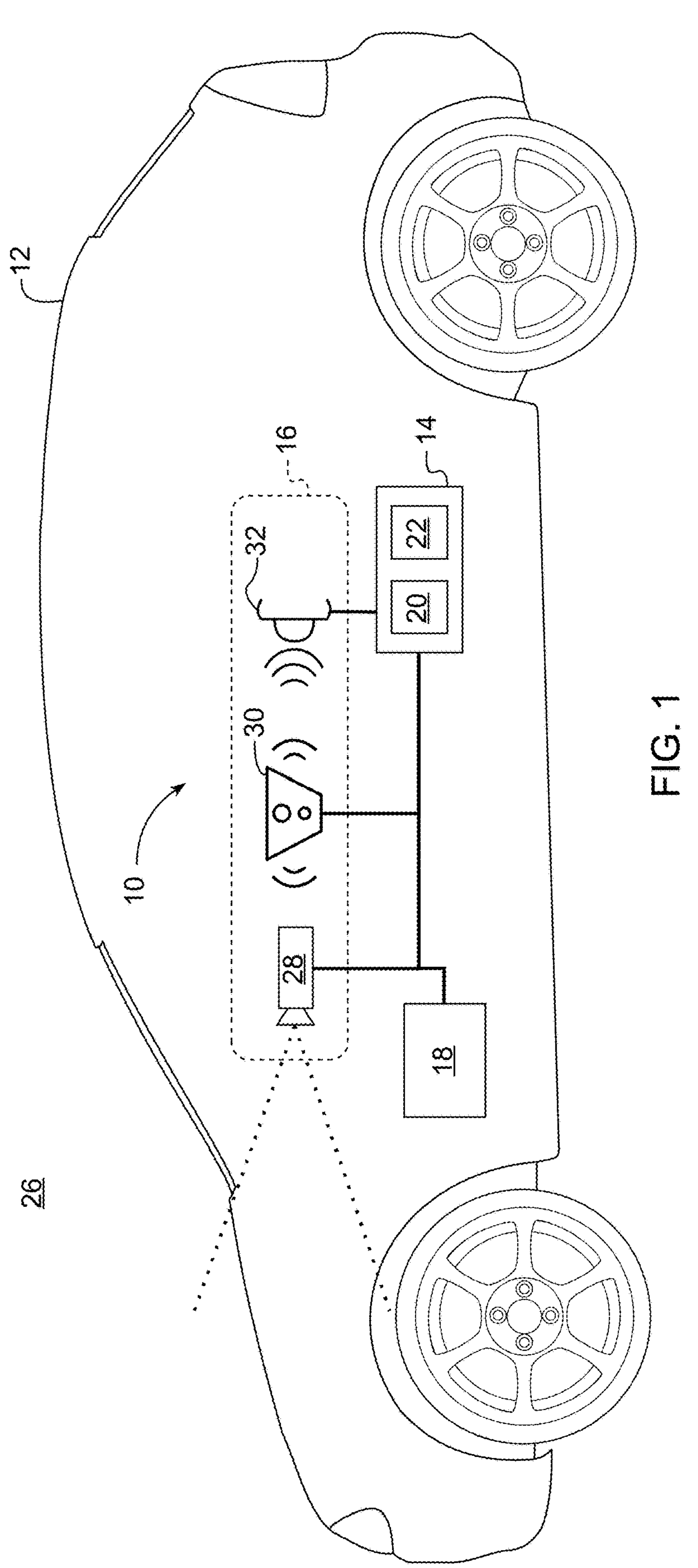
FIG. 1 is a schematic diagram of a system for path planning for a vehicle, according to an exemplary embodiment.

Referring to FIG. 1, a system for path planning for a vehicle is illustrated and generally indicated by reference number 10. The system 10 is shown with an exemplary vehicle 12. While a passenger vehicle is illustrated, it should be appreciated that the vehicle 12 may be any type of vehicle without departing from the scope of the present disclosure. The system 10 generally includes a controller 14, vehicle perception sensor 16, and an automated driving system 18.

The controller 14 is used to implement a method 100 for path planning for a vehicle, as will be described below. The controller 14 includes at least one processor 20 and a non-transitory computer readable storage device or media 22. The processor 20 may be a custom made or commercially available processor, a central processing unit (CPU), a graphics processing unit (GPU), an auxiliary processor among several processors associated with the controller 14, a semiconductor-based microprocessor (in the form of a microchip or chip set), a macroprocessor, a combination thereof, or generally a device for executing instructions.

The computer readable storage device or media 22 may include volatile and nonvolatile storage in read-only memory (ROM), random-access memory (RAM), and keep-alive memory (KAM), for example. KAM is a persistent or non-volatile memory that may be used to store various operating variables while the processor 20 is powered down. The computer-readable storage device or media 22 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 14 to control various systems of the vehicle 12.

The controller 14 may also consist of multiple controllers which are in electrical communication with each other. The controller 14 may be inter-connected with additional systems and/or controllers of the vehicle 12, allowing the controller 14 to access data such as, for example, speed, acceleration, braking, and steering angle of the vehicle 12.

The controller 14 is in electrical communication with the vehicle perception sensor 16. In an exemplary embodiment, the electrical communication is established using, for example, a CAN network, a FLEXRAY network, a local area network (e.g., WiFi, ethernet, and the like), a serial peripheral interface (SPI) network, or the like. It should be understood that various additional wired and wireless techniques and communication protocols for communicating with the controller 14 are within the scope of the present disclosure. It should further be understood that, in the scope of the present disclosure, electrical communication also includes power and/or energy transfer between electrical devices (e.g., using conducting wires and/or wireless power transmission techniques).

The vehicle perception sensor 16 is used to perceive objects (e.g., obstacles 24 (FIG. 2)) in an environment 26 surrounding the vehicle 12. Furthermore, the vehicle perception sensor 16 is used to measure distances between multiple objects in the environment 26 and distances between the vehicle 12 and objects in the environment 26. In an exemplary embodiment, the vehicle perception sensor 16 includes at least one of: a camera 28, a light detection and ranging (LiDAR) sensor 30, and an ultrasonic sensor 32.

The camera 28 is used to capture images and/or videos of the environment 26 surrounding the vehicle 12. In an exemplary embodiment, the camera 28 includes one or more cameras having a view of the environment 26 surrounding the vehicle 12. In a non-limiting example, the camera 28 is affixed within the vehicle 12, for example, to a headliner or a windscreen of the vehicle 12, having a view through the windscreen of the vehicle 12. In another non-limiting example, the camera 28 is affixed to an exterior of the vehicle 12, for example, on a roof of the vehicle 12, having a view of the environment 26 surrounding the vehicle 12.

In another exemplary embodiment, the camera 28 includes a surround view camera system including a plurality of cameras (also known as satellite cameras) arranged to provide a view of the environment 26 adjacent to all sides of the vehicle 12. In a non-limiting example, the camera system includes a front-facing camera (mounted, for example, in a front grille of the vehicle 12), a rear-facing camera (mounted, for example, on a rear tailgate of the vehicle 12), and two side-facing cameras (mounted, for example, under each of two side-view mirrors of the vehicle 12). In another non-limiting example, the camera system further includes an additional rear-view camera mounted near a center high mounted stop lamp of the vehicle 12.

It should be understood that camera systems having additional cameras and/or additional mounting locations are within the scope of the present disclosure. It should further be understood that the camera 28 may include a stereoscopic camera having distance measurement capabilities, an infrared camera, a thermal camera, and/or any other type of camera or image sensing device without departing from the scope of the present disclosure. The camera 28 is in electrical communication with the controller 14, as discussed above.

The LiDAR sensor 30 is used for remote sensing and environmental mapping. The LiDAR sensor 30 functions by emitting laser pulses and measuring the time it takes for the laser pulses to return to the LiDAR sensor 30 after hitting objects. In an exemplary embodiment, the LiDAR sensor 30 includes a LiDAR laser source, a LiDAR scanner or mirror, a LiDAR photodetector, and a LiDAR time-of-flight measurement system. In a non-limiting example, the LiDAR laser source emits laser pulses that travel to the target area, and the LiDAR scanner directs these pulses in different directions. The emitted laser pulses interact with objects in the environment and their reflections are captured by the LiDAR photodetector. The LiDAR time-of-flight measurement system calculates the distance to the objects based on the time between emission of the laser pulses by the LiDAR laser source and reception of the reflected laser pulses by the LiDAR photodetector. The LiDAR sensor 30 is in electrical communication with the controller 14, as discussed above.

The ultrasonic sensor 32 is used to measure distances in the environment 26 surrounding the vehicle 12. In an exemplary embodiment, the ultrasonic sensor 32 includes an ultrasonic transducer and an ultrasonic receiver. The ultrasonic transducer emits ultrasonic pulses, and the ultrasonic receiver captures ultrasonic pulses after they have reflected off of an object. In a non-limiting example, the ultrasonic transducer transmits ultrasonic waves, which bounce off the object and return to the ultrasonic receiver. The ultrasonic sensor 32 measures the time it takes for the ultrasonic pulses to make the round trip from the ultrasonic transducer to the ultrasonic receiver and calculates a distance based on the speed of sound in a given medium (e.g., air). The ultrasonic sensor 32 is in electrical communication with the controller 14, as discussed above.

It should be understood that the foregoing discussion of the camera 28, the LiDAR sensor 30, and the ultrasonic sensor 32 is merely exemplary in nature, and that the vehicle perception sensor 16 may include any number of additional or alternative sensors, including, for example, radar sensors and/or the like without departing from the scope of the present disclosure.

The automated driving system 18 is used to provide assistance to an occupant of the vehicle 12 to increase occupant awareness and/or control behavior of the vehicle 12. In the scope of the present disclosure, the automated driving system 18 encompasses systems which provide any level of assistance to the occupant (e.g., blind spot warning, lane departure warning, and/or the like) and systems which are capable of autonomously driving the vehicle 12 under some or all conditions (e.g., automated lane keeping, adaptive cruise control, fully autonomous driving, and/or the like). It should be understood that all levels of driving automation defined by, for example, SAE J3016 (i.e., SAE LEVEL 0, SAE LEVEL 1, SAE LEVEL 2, SAE LEVEL 3, SAE LEVEL 4, and SAE LEVEL 5) are within the scope of the present disclosure.

In an exemplary embodiment, the automated driving system 18 is configured to detect and/or receive information about the environment 26 surrounding the vehicle 12 and process the information to provide assistance to the occupant. In some embodiments, the automated driving system 18 is a software module executed on the controller 14. In other embodiments, the automated driving system 18 includes a separate automated driving system controller, similar to the controller 14, capable of processing the information about the environment 26 surrounding the vehicle 12. In an exemplary embodiment, the automated driving system 18 may operate in a manual operation mode, a partially automated operation mode, and a fully automated operation mode.

In the scope of the present disclosure, the manual operation mode means that the automated driving system 18 provides warnings or notifications to the occupant but does not intervene or control the vehicle 12 directly. In a non-limiting example, the automated driving system 18 receives information from the vehicle perception sensor 16. Using techniques such as, for example, computer vision, the automated driving system 18 understands the environment 26 surrounding the vehicle 12 and provides assistance to the occupant. For example, if the automated driving system 18 identifies, based on data from the vehicle perception sensor 16, that the vehicle 12 is likely to collide with a remote vehicle, the automated driving system 18 may use a display to provide a warning to the occupant.

In the scope of the present disclosure, the partially automated operation mode means that the automated driving system 18 provides warnings or notifications to the occupant and may intervene or control the vehicle 12 directly in certain situations. In a non-limiting example, the automated driving system 18 is additionally in electrical communication with components of the vehicle 12 such as a brake system, a propulsion system, and/or a steering system of the vehicle 12, such that the automated driving system 18 may control the behavior of the vehicle 12. In a non-limiting example, the automated driving system 18 may control the behavior of the vehicle 12 by applying brakes of the vehicle 12 to avoid an imminent collision. In another non-limiting example, the automated driving system 18 may control the steering system of the vehicle 12 to provide an automated lane keeping feature. In another non-limiting example, the automated driving system 18 may control the brake system, propulsion system, and steering system of the vehicle 12 to temporarily drive the vehicle 12 towards a predetermined destination. However, intervention by the occupant may be required at any time. In an exemplary embodiment, the automated driving system 18 may include additional components such as, for example, an eye tracking device configured to monitor an attention level of the occupant and ensure that the occupant is prepared to take over control of the vehicle 12.

In the scope of the present disclosure, the fully automated operation mode means that the automated driving system 18 uses data from the vehicle perception sensor 16 to understand the environment 26 and control the vehicle 12 to drive the vehicle 12 to a predetermined destination without a need for control or intervention by the occupant.

The automated driving system 18 operates using a path planning algorithm which is configured to generate a safe and efficient trajectory for the vehicle 12 to navigate in the environment surrounding the vehicle 12. In an exemplary embodiment, the path planning algorithm is a machine learning algorithm trained to output control signals for the vehicle 12 based on input data collected from the vehicle perception sensor 16. In another exemplary embodiment, the path planning algorithm is a deterministic algorithm which has been programmed to output control signals for the vehicle 12 based on data collected from the vehicle perception sensor 16.

In a non-limiting example, the path planning algorithm generates a sequence of waypoints or a continuous path that the vehicle 12 should follow to reach a destination while adhering to rules, regulations, and safety constraints. The sequence of waypoints or continuous path is generated based at least in part on a detailed map and a current state of the vehicle 12 (i.e., position, velocity, and orientation of the vehicle 12). The detailed map includes, for example, information about lane boundaries, road geometry, speed limits, traffic signs, and/or other relevant features. In an exemplary embodiment, the detailed map is stored in the media 22 of the controller 14 and/or on a remote database or server. In another exemplary embodiment, the path planning algorithm performs perception and mapping tasks to interpret data collected from the vehicle perception sensor 16 and create, update, and/or augment the detailed map. As will be discussed in greater detail below, the present disclosure provides a new and improved system and method for path planning for use in dynamic or recently changed environments (e.g., road construction zones) where detailed map data may be outdated or unavailable.

It should be understood that the automated driving system 18 may include any software and/or hardware module configured to operate in the manual operation mode, the partially automated operation mode, or the fully automated operation mode as described above. The automated driving system 18 is in electrical communication with the controller 14, as discussed above.

Figure 2:
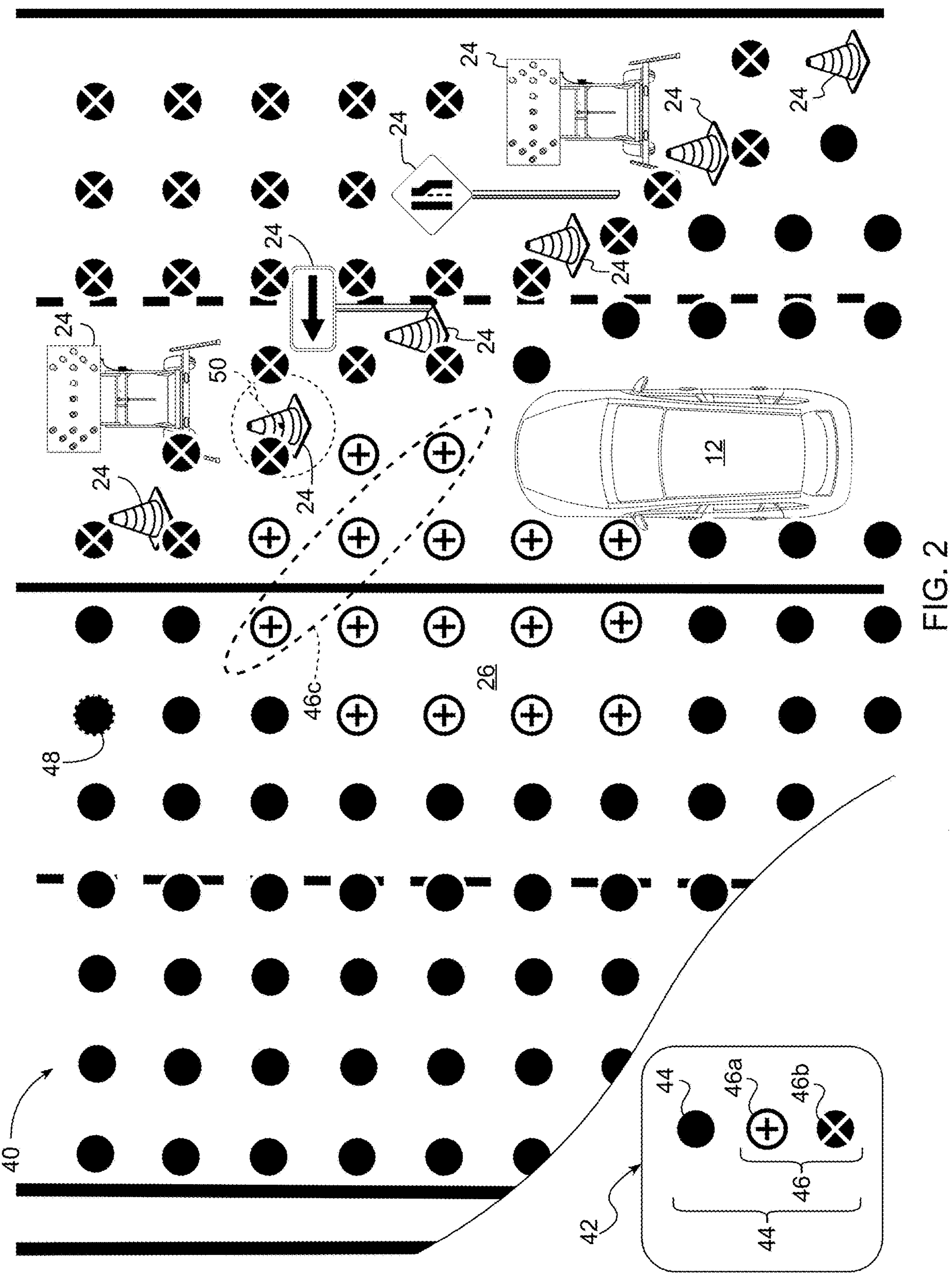
FIG. 2 is a schematic diagram of a roadway including a plurality of obstacles, according to an exemplary embodiment.

Referring to FIG. 2, a schematic diagram of a roadway 40 including a plurality of obstacles 24 and a key 42 indicating the meaning of symbols used in the schematic diagram is shown. The roadway 40 is shown overlayed with a plurality of location points 44. Each of the plurality of location points 44 represents a location within the environment 26. The plurality of location points 44 may include an arbitrarily large number of points in the environment 26. In an exemplary embodiment, the plurality of location points 44 are evenly disturbed throughout the environment 26 at a predetermined spacing (e.g., one meter).

A subset of the plurality of location points 44 is referred to as a plurality of candidate points 46. A first subset of the plurality of candidate points 46 is referred to as a plurality of feasible candidate points 46*a*. A second subset of the plurality of candidate points 46 is referred to as a plurality of infeasible candidate points 46*b*. A first subset of the plurality of feasible candidate points 46*a* is referred to as a plurality of optimal feasible candidate points 46*c*. One of the plurality of location points 44 is referred to as a goal location 48. It should be understood that the plurality of location points 44 are not necessarily physical objects in the environment 26, but rather a virtual representation of the environment 26 generated by the controller 14. Determination of the plurality of location points 44, the plurality of feasible candidate points 46*a*, the plurality of infeasible candidate points 46*b*, the plurality of optimal feasible candidate points 46*c*, and the goal location 48 will be discussed in greater detail below.

The plurality of obstacles 24 are objects on or near the roadway 40 in the environment 26. In an exemplary embodiment, at least one of the plurality of obstacles 24 is a marker, barrier, construction equipment/vehicle, road sign, and/or the like indicating a construction zone on the roadway 40, as shown in FIG. 2. Each of the plurality of obstacles 24 has a minimum allowed distance 50 between the vehicle 12 and the obstacle (also referred to as a "safe zone"). Therefore, the minimum allowed distance 50 forms a radius around each of the plurality of obstacles 24. To avoid collisions, the automated driving system 18 ensures that the vehicle 12 remains outside of the radius around each of the plurality of obstacles 24 defined by the minimum allowed distance 50. While FIG. 2 depicts the minimum allowed distance 50 for only one of the plurality of obstacles 24, it should be understood that each of the plurality of obstacles 24 has a minimum allowed distance 50 which can be understood in the same manner as the example depicted in FIG. 2.

In an exemplary embodiment, the minimum allowed distance 50 for each of the plurality of obstacles 24 is predetermined and saved in the media 22 of the controller 14. In another exemplary embodiment, the minimum allowed distance 50 for each of the plurality of obstacles 24 is determined dynamically based on a type or classification of each of the plurality of obstacles 24 (e.g., traffic cone, traffic sign, construction vehicle, etc.) or based on measurements performed using the vehicle perception sensor 16.

Figure 3:
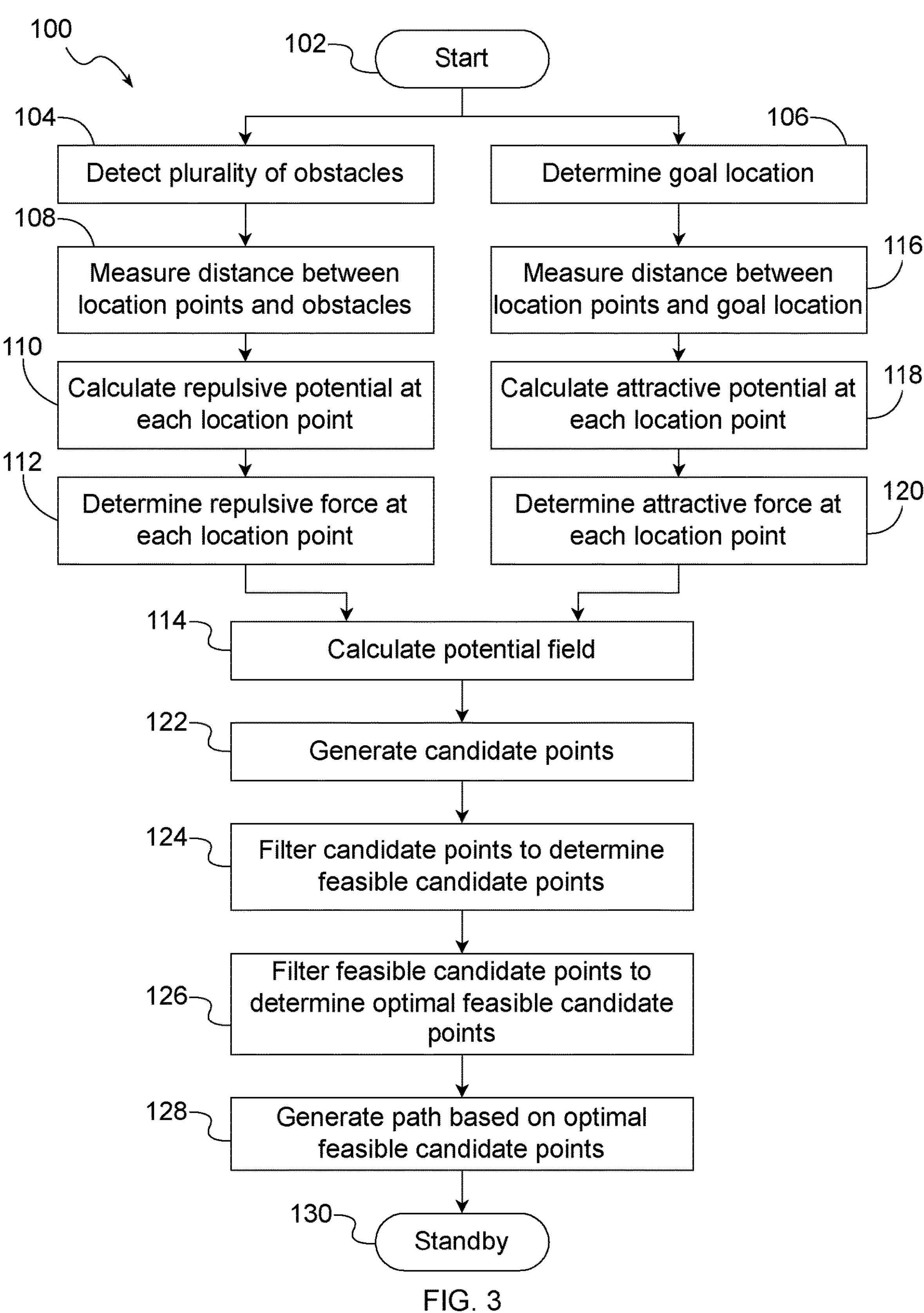
FIG. 3 is a flowchart of a method for path planning for a vehicle, according to an exemplary embodiment.

In FIG. 3, a flowchart of the method 100 for path planning for a vehicle is shown. Referring to FIG. 3 and with continued reference to FIG. 2, the method 100 beings at block 102 and proceeds to blocks 104 and 106. At block 104, the controller 14 uses the vehicle perception sensor 16 to detect the plurality of obstacles 24 in the environment 26 surrounding the vehicle 12. As discussed above, in an exemplary embodiment, the plurality of obstacles 24 are objects on or near the roadway 40 in the environment 26. In a non-limiting example, at least one of the plurality of obstacles 24 is a marker, barrier, construction equipment/vehicle, road sign, and/or the like indicating a construction zone on the roadway 40. In the scope of the present disclosure, detecting the plurality of obstacles 24 means identifying the plurality of obstacles 24 and recording a coordinate location of each of the plurality of obstacles 24. After block 104, the method 100 proceeds to block 108.

At block 108, the controller 14 uses the vehicle perception sensor 16 to measure a distance between each of the plurality of location points 44 and each of the plurality of obstacles 24. In an exemplary embodiment, the measurement data is stored in the media 22 of the controller 14. In a non-limiting example, the controller 14 uses the vehicle perception sensor 16 to generate a simultaneous localization and mapping (SLAM) map of the environment 26. The SLAM map may subsequently be analyzed to determine the distance between each of the plurality of location points 44 and each of the plurality of obstacles 24. After block 108, the method 100 proceeds to block 110.

At block 110, the controller 14 calculates a repulsive potential at each of the plurality of location points 44. In an exemplary embodiment, the repulsive potential is calculated based at least in part on the distance between each of the plurality of location points 44 and each of the plurality of obstacles 24 measured at block 108. In a non-limiting example, the repulsive potential at each of the plurality of location points 44 is defined by a repulsive potential function:

$$U_{rep}(s) = \sum \begin{cases} \frac{1}{2}k_r\left(\frac{1}{\rho_i} - \frac{1}{\rho_{0,i}}\right)^2 & \text{if } \rho_i \le \rho_{0,i} \\ 0 & \text{if } \rho_i > \rho_{0,i} \end{cases} \quad (1)$$

where $U_{rep}(s)$ is the repulsive potential function, s is a vector describing a coordinate location of one of the plurality of location points 44 within the environment 26, $k_r$ is a predetermined repulsive constant, $\rho_i$ is a distance between the location of the one of the plurality of location points 44 and an ith obstacle of the plurality of obstacles 24 as determined at block 108, $\rho_{0,i}$ is the minimum allowed distance 50 between the vehicle 12 and the ith obstacle of the plurality of obstacles 24, and the summation operator Σ indicates a summation over each of the plurality of obstacles 24. After block 110, the method 100 proceeds to block 112.

At block 112, the controller 14 determines a repulsive force at each of the plurality of location points 44. In an exemplary embodiment, the repulsive force is determined based at least in part on the repulsive potential determined at block 110. In a non-limiting example, the repulsive force is defined by a repulsive force function:

$$F_r(s) = -\nabla U_{rep}(s) = \sum \begin{cases} k_r\left(\frac{1}{\rho_i} - \frac{1}{\rho_{0,i}}\right)\frac{1}{\rho_i^2}\frac{s - s_0}{\rho_i} & \text{if } \rho_i \le \rho_{0,i} \\ 0 & \text{if } \rho_i > \rho_{0,i} \end{cases} \quad (2)$$

where $F_r(s)$ is the repulsive force function, ∇ is the gradient operator, s is the vector describing a coordinate location of one of the plurality of location points 44 within the environment 26, $k_r$ is the predetermined repulsive constant, $\rho_i$ is the distance between the location of the one of the plurality of location points 44 and an ith obstacle of the plurality of obstacles 24 as determined at block 108, $\rho_{0,i}$ is the minimum allowed distance 50 between the vehicle 12 and the ith obstacle of the plurality of obstacles 24, $s_0$ is the is the vector describing a location of one of the plurality of obstacles 24 which is closest to the one of the plurality of location points 44 described by the vector s, and the summation operator Σ indicates a summation over each of the plurality of obstacles 24. After block 112, the method 100 proceeds to block 114, as will be discussed in greater detail below.

At block 106, the controller 14 determines the goal location 48 in the environment 26. In an exemplary embodiment, the goal location 48 is determined based on a previously determined route or destination used by the automated driving system 18 to direct the vehicle 12. In a non-limiting example, the vehicle 12 is typically controlled automatically by the automated driving system 18. When the vehicle 12 encounters the plurality of obstacles 24, which may be unanticipated by the path planning algorithm of the automated driving system 18, the method 100 is executed and the goal location 48 is chosen based on destination information used by the path planning algorithm of the automated driving system 18. In another exemplary embodiment, the goal location is determined based on a destination location in a navigation system of the vehicle 12. After block 106, the method 100 proceeds to block 116.

At block 116, the controller 14 uses the vehicle perception sensor 16 to measure a distance between each of the plurality of location points 44 and the goal location 48. In an exemplary embodiment, the measurement data is stored in the media 22 of the controller 14. In a non-limiting example, the controller 14 uses the vehicle perception sensor 16 to generate a simultaneous localization and mapping (SLAM) map of the environment 26. The SLAM map may subsequently be analyzed to determine the distance between each of the plurality of location points 44 and the goal location 48. After block 116, the method 100 proceeds to block 118.

At block 118, the controller 14 calculates an attractive potential at each of the plurality of location points 44. In an exemplary embodiment, the attractive potential is calculated based at least in part on the distance between each of the plurality of location points 44 and the goal location 48 measured at block 116. In a non-limiting example, the attractive potential at each of the plurality of location points 44 is defined by an attractive potential function:

$$U_{att}(s) = \begin{cases} k_a|s - s_d|^2 & \text{if } |s - s_d| \le d_a \\ k_a\left(2d_a|s - s_d| - d_a^2\right) & \text{if } |s - s_d| > d_a \end{cases} \quad (3)$$

where $U_{att}(s)$ is the attractive potential function, s is the vector describing a coordinate location of one of the plurality of location points 44, $k_a$ is a predetermined attractive constant, $s_d$ is a vector describing the coordinate location of the goal location 48, and $d_a$ is a predetermined attractive threshold. After block 118, the method 100 proceeds to block 120.

At block 120, the controller 14 determines an attractive force at each of the plurality of location points 44. In an exemplary embodiment, the attractive force is determined based at least in part on the attractive potential determined at block 118. In a non-limiting example, the attractive force is defined by an attractive force function:

$$F_a(s) = -\nabla U_{att}(s) = \begin{cases} -2k_a(s - s_d) & \text{if } |s - s_d| \le d_a \\ -2k_a d_a \dfrac{s - s_d}{|s - s_d|} & \text{if } |s - s_d| > d_a \end{cases} \quad (4)$$

where $F_a(s)$ is the attractive force function, $\nabla$ is the gradient operator, s is the vector describing a coordinate location of one of the plurality of location points 44, $k_a$ is the predetermined attractive constant, $s_d$ is the vector describing the coordinate location of the goal location 48, and $d_a$ is the predetermined attractive threshold. After block 120, the method 100 proceeds to block 114.

At block 114, the controller 14 calculates a potential field representing the environment 26 surrounding the vehicle 12. In the scope of the present disclosure, the potential field quantifies a suitability of each of the plurality of location points 44 in the environment 26 for inclusion in a path for the vehicle 12. In a non-limiting example, the higher the value of the potential field at a given location point of the plurality of location points 44, the less suitable the given location point is for inclusion in the path for the vehicle 12. The lower the value of the potential field at a given location point of the plurality of location points 44, the more suitable the given location point is for inclusion in the path for the vehicle 12. In an exemplary embodiment, the potential field is calculated based at least in part on the repulsive force function (Equation 2) determined at block 112 and the attractive force function (Equation 4) determined at block 120. In a non-limiting example, the potential field is defined by a potential field function:

$$F(s) = F_r(s) + F_a(s) \quad (5)$$

where F(s) is the potential field function, $F_r(s)$ is the repulsive force function (Equation 2), and $F_a(s)$ is the attractive force function (Equation 4). In other words, a value of the potential field at each of the plurality of location points 44 is equal to a sum of the repulsive force (as determined with Equation 2) at each of the plurality of location points 44 and the attractive force (as determined with Equation 4) at each of the plurality of location points 44. In an exemplary embodiment, the environment 26 is divided into two regions based on the value of the potential field. In a non-limiting example, a repellor region is defined to include areas of the environment 26 where the value of the potential field function is greater than a predetermined potential field value threshold. An attractor region is defined to include areas of the environment 26 where the value of the potential field function is less than or equal to the predetermined potential field value threshold. After block 114, the method 100 proceeds to block 122.

At block 122, the controller 14 generates the plurality of candidate points 46. In the scope of the present disclosure, each of the plurality of candidate points 46 describes a possible location of the vehicle 12 after traveling for a predetermined length of time (e.g., two seconds). In an exemplary embodiment, each of the plurality of candidate points 46 are represented as a coordinate point:

$$s_{e,i} = (x_{e,i}, y_{e,i}) \quad (6)$$

where $s_{e,i}$ is an ith candidate point of the plurality of candidate points 46, $x_{e,i}$ is an x-coordinate of the ith candidate point of the plurality of candidate points 46 in the environment 26, and $y_{e,i}$ is a y-coordinate of the ith candidate point of the plurality of candidate points 46.

The x-coordinate and y-coordinates of the ith candidate point of the plurality of candidate points 46 may be determined by:

$$x_{e,i} = x_s + v_{long}t + \frac{1}{2}a_{long}t^2 \quad (7)$$

$$y_{e,i} = y_s + v_{lat}t + \frac{1}{2}a_{lat}t^2 \quad (8)$$

where $x_{e,i}$ is the x-coordinate of the ith candidate point of the plurality of candidate points 46, $x_s$ is an x-coordinate of a current location of the vehicle 12, $v_{long}$ is a current longitudinal velocity of the vehicle 12, t is the predetermined length of time (e.g., two seconds), and $a_{long}$ is a feasible longitudinal acceleration for the vehicle 12. Furthermore, $y_{e,i}$ is the y-coordinate of the ith candidate point of the plurality of candidate points 46, $y_s$ is a y-coordinate of the current location of the vehicle 12, $V_{lat}$ is a current lateral velocity of the vehicle 12, and $a_{lat}$ is a feasible lateral acceleration for the vehicle 12. It should be understood that the foregoing method for generating the plurality of candidate points 46 is merely exemplary in nature, and that the plurality of candidate points 46 may be generated using additional or alternative methods without departing from the scope of the present disclosure. After block 122, the method 100 proceeds to block 124.

At block 124, the controller 14 filters the plurality of candidate points 46 determined at block 122 to determine the plurality of feasible candidate points **46*a* and the plurality of infeasible candidate points 46*b*. The plurality of feasible candidate points 46*a* and the plurality of infeasible candidate points 46*b* each include a subset of the plurality of candidate points 46. In an exemplary embodiment, the plurality of feasible candidate points 46*a* includes only those candidate points 46 which are in the attractor region, as discussed above in reference to block 114. In a non-limiting example, the controller 14 evaluates the potential field function (Equation 5) at each of the plurality of candidate points 46 and compares the value of the potential field function at each of the plurality of candidate points 46 to the predetermined potential field value threshold. The plurality of feasible candidate points 46*a* includes only those candidate points 46** for which the value of the potential field function is less than or equal to the predetermined potential field value threshold.

In another exemplary embodiment, the plurality of feasible candidate points **46*a* includes only those candidate points 46 which do not require the vehicle 12 to violate vehicle kinematic/dynamic constraints. In a non-limiting example, the vehicle kinematic/dynamic constraints include, for example, a maximum longitudinal acceleration, a maximum lateral acceleration, a maximum yaw rate, a maximum speed, and/or the like. Therefore, based on a current location, speed, and heading of the vehicle 12, the controller 14 performs kinematic calculations to determine whether it is possible to reach each of the plurality of candidate points 46 without violating the vehicle kinematic/dynamic constraints. Candidate points 46 for which the value of the potential field function is less than or equal to the predetermined potential field value threshold and which do not require violation of the vehicle kinematic/dynamic constraints are included in the plurality of feasible candidate points 46***a*.

In an exemplary embodiment, the plurality of infeasible candidate points 46*b* includes only those candidate points 46 which are in the repellor region, as discussed above in reference to block 114. In a non-limiting example, the controller 14 evaluates the potential field function (Equation 5) at each of the plurality of candidate points 46 and compares the value of the potential field function at each of the plurality of candidate points 46 to the predetermined potential field value threshold. The plurality of infeasible candidate points 46*b* includes candidate points 46 for which the value of the potential field function is greater than the predetermined potential field value threshold or which require violation of the vehicle kinematic/dynamic constraints are included in the plurality of infeasible candidate points 46*b*. After block 124, the method 100 proceeds to block 126.

At block 126, the controller 14 filters the plurality of feasible candidate points 46*a* to determine the plurality of optimal feasible candidate points 46*c*. Accordingly, the plurality of optimal feasible candidate points 46*c* includes a subset of the plurality of feasible candidate points 46*a*. In an exemplary embodiment, the plurality of optimal feasible candidate points 46*c* is determined using an optimization algorithm based at least in part on the potential field function (Equation 5).

In an exemplary embodiment, the controller 14 uses the optimization algorithm to find a set of feasible candidate points having a lowest total potential field value. In a non-limiting example, a cost function is determined from the potential field function (Equation 5) by transforming potential field function (Equation 5) from a nonlinear form to a quadratic form using the Taylor series:

$$F_Q = F(s_i) + (s - s_i)\dot{F}(s_i) + \frac{1}{2}(s - s_i)^T \ddot{F}(s_i)(s - s_i) \tag{9}$$

where $F_Q$ is the cost function, $F(s_i)$ is the potential field function (Equation 5) evaluated at an ith feasible candidate point of the plurality of feasible candidate points 46*a*, and s is a vector describing a location current location of the vehicle 12. Subsequently, an optimization algorithm such as, for example, quadratic programming, is used to determine the plurality of optimal feasible candidate points 46*c* such as to minimize the cost function (Equation 9). It should be understood that the foregoing optimization method is merely exemplary in nature, and that additional or alternative optimization methods (e.g., Gradient Descent, Newton's Method, Quasi-Newton Methods (e.g., BFGS, L-BFGS), Genetic Algorithms, and/or the like) may be used without departing from the scope of the present disclosure. After block 126, the method 100 proceeds to block 128.

At block 128, the controller 14 generates the path for the vehicle 12. In an exemplary embodiment, the path for the vehicle is generated based at least in part on the plurality of optimal feasible candidate points 46*c* determined at block 126. In an exemplary embodiment, the plurality of optimal feasible candidate points 46*c* are provided to the path planning algorithm of the automated driving system 18. In a non-limiting example, the path planning algorithm generates the path by linking the plurality of optimal feasible candidate points 46*c* with a series of quintic spline curves to provide a smooth path.

In a non-limiting example, a quintic spline curve generation process may involve several components. Firstly, an input including the plurality of optimal feasible candidate points 46*c* is provided. Subsequently, the path planning algorithm utilizes polynomial functions of the fifth degree between each pair of adjacent points of the plurality of optimal feasible candidate points 46*c* to construct path segments. The polynomial functions are chosen to satisfy certain constraints, such as position, velocity, and acceleration continuity at the junctions of adjacent path segments. Next, the path planning algorithm involves solving a system of equations to determine the coefficients of the polynomial functions while satisfying constrains and boundary conditions, such as initial and final velocities or accelerations, to ensure continuity and smoothness at the endpoints of the path. The coefficients are then used to define the path segments. It should be understood that the foregoing path planning method is merely exemplary in nature, and that additional and/or alternative path planning methods or algorithms may be used without departing from the scope of the present disclosure.

In an exemplary embodiment, after generating the path for the vehicle 12, the controller 14 provides the path to the automated driving system 18. The automated driving system 18 controls components of the vehicle 12 such as the brake system, the propulsion system, and/or the steering system of the vehicle 12 to drive the vehicle 12 along the path. In another exemplary embodiment, the controller 14 displays the path to the occupant of the vehicle 12 using a display such as, for example, an infotainment system, a head-up display (HUD), and/or the like. In another exemplary embodiment, the controller 14 transmits the path to a centralized server, back-office, and/or the like for further analysis, map database updating tasks, and/or the like. After block 128, the method 100 proceeds to enter a standby state at block 130.

In an exemplary embodiment, the controller 14 repeatedly exits the standby state 130 and restarts the method 100 at block 102. In a non-limiting example, the controller 14 exits the standby state 130 and restarts the method 100 on a timer, for example, every three hundred milliseconds.

The system 10 and method 100 of the present disclosure offer several advantages. The system 10 and method 100 are advantageous for path planning for semi- and fully-autonomous vehicles in dynamic and/or recently changed environments (e.g., construction zones). The system 10 and method 100 are able to function in real-time using only perception sensor data and without any pre-acquired map data. By characterizing the distribution of obstacles 24 in the environment 26 mathematically using the potential field function (Equation 5), the method 100 allows for use of optimization algorithms to calculate an optimal path.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for path planning for a vehicle, the method comprising:

determining a repulsive potential at each of a plurality of location points in an environment surrounding the vehicle using a vehicle perception sensor;

determining an attractive potential at each of the plurality of location points in the environment surrounding the vehicle using the vehicle perception sensor;

calculating a potential field representing the environment surrounding the vehicle based at least in part on the attractive potential at each of the plurality of location points and the repulsive potential at each of the plurality of location points, wherein the potential field quantifies a suitability of each of the plurality of location points in the environment for inclusion in a path for the vehicle, wherein calculating the potential field further comprises:

determining a repulsive force at each of the plurality of location points based at least in part on the repulsive potential at each of the plurality of location points;

determining an attractive force at each of the plurality of location points based at least in part on the attractive potential at each of the plurality of location points; and calculating the potential field based at least in part on the repulsive force at each of the plurality of location points and the attractive force at each of the plurality of location points, wherein a value of the potential field at each of the plurality of location points is equal to a sum of the repulsive force at each of the plurality of location points and the attractive force at each of the plurality of location points, and wherein the potential field at each of the plurality of location points is defined by a potential field function:

$$F(s) = \left\{ \sum \begin{cases} k_r\left(\frac{1}{\rho_i} - \frac{1}{\rho_{0,i}}\right)\frac{1}{\rho_i^2}\frac{s-s_0}{\rho_i} & \text{if } \rho_i \le \rho_{0,i} \\ 0 & \text{if } \rho_i > \rho_{0,i} \end{cases} \right\} + \left\{ \begin{matrix} -2k_a(s-s_d) & \text{if } |s-s_d| \le d_a \\ -2k_a d_a \frac{s-s_d}{|s-s_d|} & \text{if } |s-s_d| > d_a \end{matrix} \right\}$$

wherein F(s) is the potential field function, s is a vector describing a location of one of the plurality of location points, $k_r$ is a predetermined repulsive constant, $\rho_i$ is a distance between the location of the one of the plurality of location points and an ith obstacle of a plurality of obstacles, $\rho_{0,i}$ is a minimum allowed distance between the vehicle and the ith obstacle of the plurality of obstacles, $s_0$ is a vector describing a location of one of the plurality of obstacles which is closest to the one of the plurality of location points s, a summation operator Σ indicates a summation over each of the plurality of obstacles, $k_a$ is a predetermined attractive constant, $s_d$ is a vector describing a goal location, and $d_a$ is a predetermined attractive threshold; and generating the path for the vehicle based at least in part on the potential field.

2. The method of claim 1, wherein determining the repulsive potential at each of the plurality of location points further comprises:

detecting a plurality of obstacles using the vehicle perception sensor;

measuring a distance between each of the plurality of location points and each of the plurality of obstacles using the vehicle perception sensor; and calculating the repulsive potential at each of the plurality of location points based at least in part on the distance between each of the plurality of location points and each of the plurality of obstacles.

3. The method of claim 2, wherein detecting the plurality of obstacles further comprises:

detecting the plurality of obstacles using the vehicle perception sensor, wherein at least one of the plurality of obstacles is a marker, barrier, or road sign indicating a construction zone.

4. The method of claim 2, wherein calculating the repulsive potential at each of the plurality of location points further comprises:

calculating the repulsive potential at each of the plurality of location points, wherein the repulsive potential at each of the plurality of location points is defined by a repulsive potential function:

$$U_{rep}(s) = \sum \begin{cases} \frac{1}{2}k_r\left(\frac{1}{\rho_i} - \frac{1}{\rho_{0,i}}\right)^2 & \text{if } \rho_i \le \rho_{0,i} \\ 0 & \text{if } \rho_i > \rho_{0,i} \end{cases}$$

wherein $U_{rep}(s)$ is the repulsive potential function, s is a vector describing a location of one of the plurality of location points, $k_r$ is a predetermined repulsive constant, $\rho_i$ is a distance between the location of the one of the plurality of location points and an ith obstacle of the plurality of obstacles, $\rho_{0,i}$ is a minimum allowed distance between the vehicle and the ith obstacle of the plurality of obstacles, and a summation operator Σ indicates a summation over each of the plurality of obstacles.

5. The method of claim 1, wherein determining the attractive potential at each of the plurality of location points further comprises:

determining a goal location in the environment;

determining a distance between each of the plurality of location points and the goal location; and calculating the attractive potential at each of the plurality of location points based at least in part on the distance between each of the plurality of location points and the goal location.

6. The method of claim 5, wherein calculating the attractive potential at each of the plurality of location points further comprises:

calculating the attractive potential at each of the plurality of location points, wherein the attractive potential at each of the plurality of location points is defined by an attractive potential function:

$$U_{att}(s) = \begin{cases} k_a|s-s_d|^2 & \text{if } |s-s_d| \le d_a \\ k_a\left(2d_a|s-s_d| - d_a^2\right) & \text{if } |s-s_d| > d_a \end{cases}$$

wherein $U_{att}(s)$ is the attractive potential function, s is a vector describing a location of one of the plurality of location points, $k_a$ is a predetermined attractive constant, $S_d$ is a vector describing the goal location, and $d_a$ is a predetermined attractive threshold.

7. The method of claim 1, wherein generating the path for the vehicle further comprises:

generating a plurality of candidate points, wherein each of the plurality of candidate points describes a possible location of the vehicle after driving for a predetermined length of time;

determining a plurality of feasible candidate points, wherein the plurality of feasible candidate points includes a subset of the plurality of candidate points, and wherein a value of the potential field at each of the plurality of feasible candidate points is less than or equal to a predetermined potential field value threshold;

determining a plurality of optimal feasible candidate points, wherein the plurality of optimal feasible candidate points includes a subset of the plurality of feasible candidate points, wherein the plurality of optimal feasible candidate points is determined using an optimization algorithm, and wherein the plurality of optimal feasible candidate points is determined based at least in part on a value of the potential field at each of the plurality of feasible candidate points; and generating the path for the vehicle based at least in part on the plurality of optimal feasible candidate points, wherein the path for the vehicle includes at least the plurality of optimal feasible candidate points.

8. The method of claim 7, wherein determining the plurality of optimal feasible candidate points further comprises:

determining the plurality of optimal feasible candidate points such as to minimize a cost function, wherein the cost function is determined based at least in part on the potential field function.

9. A system for path planning for a vehicle, the system comprising:

a vehicle perception sensor;

a controller in electrical communication with the vehicle perception sensor, wherein the controller is programmed to:

determine a repulsive potential at each of a plurality of location points in an environment surrounding the vehicle using the vehicle perception sensor, wherein to determine the repulsive potential, the controller is further programmed to:

detect a plurality of obstacles using the vehicle perception sensor, wherein at least one of the plurality of obstacles is a marker, barrier, or road sign indicating a construction zone;

measure a distance between each of the plurality of location points and each of the plurality of obstacles using the vehicle perception sensor; and calculate the repulsive potential at each of the plurality of location points, wherein the repulsive potential at each of the plurality of location points is defined by a repulsive potential function:

$$U_{rep}(s) = \sum \begin{cases} \frac{1}{2}k_r\left(\frac{1}{\rho_i} - \frac{1}{\rho_{0,i}}\right)^2 & \text{if } \rho_i \le \rho_{0,i} \\ 0 & \text{if } \rho_i > \rho_{0,i} \end{cases}$$

wherein $U_{rep}(s)$ is the repulsive potential function, s is a vector describing a location of one of the plurality of location points, $k_r$ is a predetermined repulsive constant, $\rho_i$ is a distance between the location of the one of the plurality of location points and an ith obstacle of the plurality of obstacles, $\rho_{0,i}$ is a minimum allowed distance between the vehicle and the ith obstacle of the plurality of obstacles, and a summation operator $\Sigma$ indicates a summation over each of the plurality of obstacles;

determine an attractive potential at each of the plurality of location points in the environment surrounding the vehicle using the vehicle perception sensor, wherein to determine the attractive potential, the controller is further programmed to:

determine a goal location in the environment;

determine a distance between each of the plurality of location points and the goal location; and calculate the attractive potential at each of the plurality of location points, wherein the attractive potential at each of the plurality of location points is defined by an attractive potential function:

$$U_{att}(s) = \begin{cases} k_a|s - s_d|^2 & \text{if } |s - s_d| \le d_a \\ k_a(2d_a|s - s_d| - d_a^2) & \text{if } |s - s_d| > d_a \end{cases}$$

wherein $U_{att}(s)$ is the attractive potential function, s is the vector describing a location of one of the plurality of location points, $k_a$ is a predetermined attractive constant, $s_d$ is a vector describing the goal location, and $d_a$ is a predetermined attractive threshold;

calculate a potential field representing the environment surrounding the vehicle based at least in part on the attractive potential at each of the plurality of location points and the repulsive potential at each of the plurality of location points, wherein the potential field quantifies a suitability of each of the plurality of location points in the environment for inclusion in a path for the vehicle; and generate the path for the vehicle based at least in part on the potential field.

10. The system of claim 9, wherein to calculate the potential field, the controller is further programmed to:

determine a repulsive force at each of the plurality of location points based at least in part on the repulsive potential at each of the plurality of location points;

determine an attractive force at each of the plurality of location points based at least in part on the attractive potential at each of the plurality of location points; and calculate the potential field based at least in part on the repulsive force at each of the plurality of location points and the attractive force at each of the plurality of location points, wherein a value of the potential field at each of the plurality of location points is equal to a sum of the repulsive force at each of the plurality of location points and the attractive force at each of the plurality of location points, and wherein the potential field at each of the plurality of location points is defined by a potential field function:

$$F(s) = F_r(s) + F_a(s)$$

wherein F(s) is the potential field function, $F_r(s)$ is a repulsive force function, and $F_a(s)$ is an attractive force function.

11. The system of claim 10, wherein to determine the repulsive force, the controller is further programmed to:

determine the repulsive force at each of the plurality of location points, wherein the repulsive force at each of the plurality of location points is defined by the repulsive force function:

$$F_r(s) = -\nabla U_{rep}(s) = \sum \begin{cases} k_r\left(\frac{1}{\rho_i} - \frac{1}{\rho_{0,i}}\right)\frac{1}{\rho_i^2}\frac{s-s_0}{\rho_i} & \text{if } \rho_i \le \rho_{0,i} \\ 0 & \text{if } \rho_i > \rho_{0,i} \end{cases}$$

wherein $F_r(s)$ is the repulsive force function, $\nabla$ is a gradient operator, s is the vector describing a location of one of the plurality of location points, $k_r$ is the predetermined repulsive constant, $\rho_i$ is the distance between the location of the one of the plurality of location points and the ith obstacle of a plurality of obstacles, $\rho_{0,i}$ is the minimum allowed distance between the vehicle and the ith obstacle of the plurality of obstacles, $s_0$ is the vector describing a location of one of the plurality of obstacles which is closest to the one of the plurality of location points s, and the summation operator $\Sigma$ indicates a summation over each of the plurality of obstacles.

12. The system of claim 11, wherein to determine the attractive force, the controller is further programmed to:

determine the attractive force at each of the plurality of location points, wherein the attractive force at each of the plurality of location points is defined by the attractive force function:

$$F_a(s) = -\nabla U_{att}(s) = \begin{cases} -2k_a(s-s_d) & \text{if } |s-s_d| \le d_a \\ -2k_a d_a \frac{s-s_d}{|s-s_d|} & \text{if } |s-s_d| > d_a \end{cases}$$

wherein $F_a(s)$ is the attractive force function, $\nabla$ is the gradient operator, s is the vector describing a location of one of the plurality of location points, $k_a$ is the predetermined attractive constant, $s_d$ is the vector describing the goal location, and $d_a$ is the predetermined attractive threshold.

13. The system of claim 12, wherein to generate the path for the vehicle, the controller is further programmed to:

generate a plurality of candidate points, wherein each of the plurality of candidate points describes a possible location of the vehicle after driving for a predetermined length of time;

determine a plurality of feasible candidate points, wherein the plurality of feasible candidate points includes a subset of the plurality of candidate points, and wherein a value of the potential field at each of the plurality of feasible candidate points is less than or equal to a predetermined potential field value threshold;

determine a plurality of optimal feasible candidate points, wherein the plurality of optimal feasible candidate points includes a subset of the plurality of feasible candidate points, wherein the plurality of optimal feasible candidate points is determined using an optimization algorithm, wherein the plurality of optimal feasible candidate points is determined based at least in part on a value of the potential field at each of the plurality of feasible candidate points, wherein the plurality of optimal feasible candidate points is determined such as to minimize a cost function, and wherein the cost function is determined based at least in part on the potential field function; and generate the path for the vehicle based at least in part on the plurality of optimal feasible candidate points, wherein the path for the vehicle includes at least the plurality of optimal feasible candidate points.

14. A method for path planning for a vehicle, the method comprising:

detecting a plurality of obstacles using a vehicle perception sensor;

measuring a distance between each of a plurality of location points and each of a plurality of obstacles in an environment surrounding the vehicle using the vehicle perception sensor;

calculating a repulsive potential at each of the plurality of location points based at least in part on the distance between each of the plurality of location points and each of the plurality of obstacles;

determining a goal location in the environment;

determining a distance between each of the plurality of location points and the goal location;

calculating an attractive potential at each of the plurality of location points based at least in part on the distance between each of the plurality of location points and the goal location;

calculating a potential field representing the environment surrounding the vehicle based at least in part on the attractive potential at each of the plurality of location points and the repulsive potential at each of the plurality of location points, wherein the potential field quantifies a suitability of each of the plurality of location points in the environment for inclusion in a path for the vehicle, wherein calculating the potential field further comprises:

determining a repulsive force at each of the plurality of location points, wherein the repulsive force at each of the plurality of location points is defined by a repulsive force function:

$$F_r(s) = -\nabla U_{rep}(s) = \sum \begin{cases} k_r\left(\frac{1}{\rho_i} - \frac{1}{\rho_{0,i}}\right)\frac{1}{\rho_i^2}\frac{s-s_0}{\rho_i} & \text{if } \rho_i \le \rho_{0,i} \\ 0 & \text{if } \rho_i > \rho_{0,i} \end{cases}$$

wherein $F_r(s)$ is the repulsive force function, $\nabla$ is a gradient operator, s is a vector describing a location of one of the plurality of location points, $k_r$ is a predetermined repulsive constant, $\rho_i$ is a distance between the location of the one of the plurality of location points and an ith obstacle of a plurality of obstacles, $\rho_{0,i}$ is a minimum allowed distance between the vehicle and the ith obstacle of the plurality of obstacles, $s_0$ is a vector describing a location of one of the plurality of obstacles which is closest to the one of the plurality of location points s, and a summation operator $\Sigma$ indicates a summation over each of the plurality of obstacles;

determining an attractive force at each of the plurality of location points, wherein the attractive force at each of the plurality of location points is defined by an attractive force function:

$$F_a(s) = -\nabla U_{att}(s) = \begin{cases} -2k_a(s-s_d) & \text{if } |s-s_d| \le d_a \\ -2k_a d_a \frac{s-s_d}{|s-s_d|} & \text{if } |s-s_d| > d_a \end{cases}$$

wherein $F_a(s)$ is the attractive force function, $\nabla$ is the gradient operator, s is the vector describing a location of one of the plurality of location points, $k_a$ is a predetermined attractive constant, $s_d$ is a vector describing a goal location, and $d_a$ is a predetermined attractive threshold;

calculating the potential field based at least in part on the repulsive force at each of the plurality of location points and the attractive force at each of the plurality of location points, wherein a value of the potential field at each of the plurality of location points is equal to a sum of the repulsive force at each of the plurality of location points and the attractive force at each of the plurality of location points, and wherein the potential field at each of the plurality of location points is defined by a potential field function:

$$F(s) = F_r(s) + F_a(s)$$

wherein F(s) is the potential field function, $F_r(s)$ is the repulsive force function, and $F_a(s)$ is the attractive force function; and generating the path for the vehicle based at least in part on the potential field.

15. The method of claim 14, wherein generating the path for the vehicle further comprises:

generating a plurality of candidate points, wherein each of the plurality of candidate points describes a possible location of the vehicle after driving for a predetermined length of time;

determining a plurality of feasible candidate points, wherein the plurality of feasible candidate points includes a subset of the plurality of candidate points, and wherein a value of the potential field function at each of the plurality of feasible candidate points is less than or equal to a predetermined potential field value threshold;

determining a plurality of optimal feasible candidate points, wherein the plurality of optimal feasible candidate points includes a subset of the plurality of feasible candidate points, wherein the plurality of optimal feasible candidate points is determined using an optimization algorithm, wherein the plurality of optimal feasible candidate points is determined based at least in part on a value of the potential field function at each of the plurality of feasible candidate points, wherein the plurality of optimal feasible candidate points is determined such as to minimize a cost function, and wherein the cost function is determined based at least in part on the potential field function; and generating the path for the vehicle based at least in part on the plurality of optimal feasible candidate points, wherein the path for the vehicle includes at least the plurality of optimal feasible candidate points.

16. The method of claim 5, wherein determining the goal location further comprises determining the goal location based on a destination location in a navigation system of the vehicle.

17. The method of claim 7, wherein generating the path for the vehicle further comprises:

generating the path for the vehicle by linking the plurality of optimal feasible candidate points with a series of quintic spline curves.

18. The system of claim 9, wherein the vehicle perception sensor includes at least one of: a camera and a light detection and ranging (LiDAR) sensor.

19. The system of claim 13, wherein to determine the plurality of feasible candidate points, the controller is further programmed to:

determine the plurality of feasible candidate points by excluding candidate points which would require the vehicle to violate vehicle kinematic/dynamic constraints, wherein the vehicle kinematic/dynamic constraints include at least one of: a maximum longitudinal acceleration, a maximum lateral acceleration, a maximum yaw rate, and a maximum speed.

20. The method of claim 14, further comprising:

controlling at least one of a brake system, a propulsion system, and a steering system of the vehicle to drive the vehicle along the generated path.

* * * * *